United States Patent
Konno et al.

(10) Patent No.: US 7,484,347 B2
(45) Date of Patent: Feb. 3, 2009

(54) PACKAGING FILLING APPARATUS AND TRANSVERSAL SEALING APPARATUS

(75) Inventors: Hidetoshi Konno, Tokyo (JP); Yasuyuki Moriyama, Tokyo (JP); Yuzo Otsuka, Tokyo (JP)

(73) Assignee: Tetra Laval Holdings & Finance S.A., Pully (CH)

( * ) Notice: Subject to any disclaimer, the term of this patent is extended or adjusted under 35 U.S.C. 154(b) by 48 days.

(21) Appl. No.: 10/575,723

(22) PCT Filed: Jul. 28, 2004

(86) PCT No.: PCT/JP2004/010718

§ 371 (c)(1),
(2), (4) Date: Apr. 13, 2006

(87) PCT Pub. No.: WO2005/035368

PCT Pub. Date: Apr. 21, 2005

(65) Prior Publication Data

US 2007/0017189 A1    Jan. 25, 2007

(30) Foreign Application Priority Data

Oct. 14, 2003    (JP)    ............................. 2003-353050

(51) Int. Cl.
*B65B 9/06*    (2006.01)
(52) U.S. Cl. ........................ 53/551; 53/373.7
(58) Field of Classification Search ................ 53/373.7, 53/374.3, 374.5, 374.6, 375.9, 550, 551, 53/552; 156/367; 219/633
See application file for complete search history.

(56) References Cited

U.S. PATENT DOCUMENTS

| | | | | |
|---|---|---|---|---|
| 3,925,139 | A * | 12/1975 | Simmons ...................... | 53/552 |
| 4,637,199 | A * | 1/1987 | Steck et al. ................... | 53/551 |
| 4,704,509 | A * | 11/1987 | Hilmersson et al. ......... | 219/633 |
| 4,731,980 | A * | 3/1988 | Worden et al. ................ | 53/551 |
| 5,031,380 | A * | 7/1991 | Ueda ............................ | 53/552 |
| 5,787,681 | A * | 8/1998 | Papina et al. ............... | 53/373.7 |
| 5,889,263 | A * | 3/1999 | Andersson ................... | 219/633 |
| 6,167,681 | B1 * | 1/2001 | Yano et al. .................. | 53/373.7 |
| 6,301,859 | B1 * | 10/2001 | Nakamura et al. ......... | 53/373.7 |
| 6,725,634 | B1 * | 4/2004 | Palmqvist et al. ............. | 53/548 |
| 6,877,295 | B1 * | 4/2005 | Benedetti et al. ............. | 53/552 |
| 7,059,100 | B2 * | 6/2006 | Babini et al. .................. | 53/552 |

FOREIGN PATENT DOCUMENTS

JP    7-156907    6/1995

(Continued)

*Primary Examiner*—Louis K Huynh
(74) *Attorney, Agent, or Firm*—Buchanan, Ingersoll & Rooney PC

(57) ABSTRACT

A packaging filling apparatus, which can obtain the most suitable sealing quality by an automatic control without checking the condition of the sealing by the operator on a regular basis, is provided. A transversal sealing apparatus 48 of the packaging filling apparatus includes a high-frequency oscillator 1, controller 2, and an inductor, which generates a magnet field in packaging material by receiving the output from the high-frequency oscillator, and is provided with a sealing quality control means 4, which transmits a control signal to the controller, based on a statistical relation between a plurality of effect factors affecting the quality of a transversal sealing 23 and the quality of transversal sealing.

4 Claims, 4 Drawing Sheets

FOREIGN PATENT DOCUMENTS

| | | |
|---|---|---|
| JP | 7-164523 | 6/1995 |
| JP | 2001-503357 | 3/2001 |
| JP | 2002-234075 | 8/2002 |
| JP | 2002-249111 | 9/2002 |
| JP | 2002-370283 | 12/2002 |

\* cited by examiner

PACKAGING FILLING APPARATUS AND TRANSVERSAL SEALING APPARATUS

This application is a U.S. national stage entry of PCT/JP04/10718, filed Jul. 28, 2004.

TECHNICAL FIELD

The present invention relates to a packaging filling apparatus for producing a packaging container, which is filled with a fluid product, such as milk and juice, and a transversal sealing apparatus, which is installed therein.

BACKGROUND ART

Formerly, when producing a packaging container filled with liquid foods (including fluid products) such as milk, a web-form packaging material composed of a flexible laminated body is longitudinally sealed to become a tubular shape, and while being filled with fluid foods, the tubular packaging material is laterally sealed to produce a packaging container.

An outline of an example of the packaging filling apparatus of the container is shown in FIG. 2. The packaging filling apparatus shown in the example has a thermoplastic layer such as polyethylene in the inside and outside layers, employing laminated packaging material made of aluminum foil, paper and the like. A packaging material web 41, which is wound in a roll-fashion, is wound off and conveyed by a roller in the packaging filling apparatus. A strip tape is spliced to an edge of the packaging material web by a strip tape applicator 43. The packaging material web passes through a sterilization tank 44 to be sterilized. The sterilizing treatment liquid attached on the surface of the packaging material is removed by a squeezing roller and air knife 45.

Then, the packaging material is formed into a tubular shape by a forming roller 46. An overlap is formed by superimposing both ends of the packaging material, and sealing is performed by a longitudinal sealing element 42 along the longitudinal direction of the tube at the overlap in the longitudinal direction. Into the tube, liquid foods are filled from a filling pipe 47. While moving the tube downward by the length corresponding to one packaging container, the tube is sandwiched by a sealing jaw of the transversal sealing apparatus 48 of the induction-heating system and an opposing jaw. A transversal sealing band is formed by performing transversal sealing in the transverse direction, and at the same time, being continuously formed into a first forming body 49. The transversal sealing band of the first forming body is cut in the middle by a cutting apparatus (not shown) such as a knife into a separate first forming body 49 to form the packaging filling container of a final configuration.

In FIG. 3, a detailed partially sectional view of the transversal sealing apparatus 48 and cutting apparatus 32 are shown. In this embodiment, while being moved downward by the length corresponding to one packaging container, a tubular packaging material 1, which is filled with foods, is caught in two pairs of forming flap 31 to be formed into a rough shape of a container, being sandwiched by two pairs of sealing jaws 48a and opposing jaw 48b, forming a transversal sealing band by performing transversal sealing in the transverse direction, and the sealing band of the connected first forming body being cut off in the middle by the knife 33 of the cutting apparatus 32 into a separate first forming body 49.

In the transversal sealing apparatus of an induction-heating system, the packaging material using, for example, aluminum foil performs transversal sealing by induction heating, utilizing its characteristics.

Patent Document 1, Japanese Patent Laid Open 1995-164523

In the case of transversal sealing by the induction-heating of the packaging material using aluminum foil, in order to control the quality of the sealing such as the width of the transversal sealing band, strength of the sealing, the operator checks the condition of the sealing to change the controller of the potentiometer connected with a high-frequency oscillator and modifies the output of the same, if necessary.

DISCLOSURE OF THE INVENTION

However, with the conventional apparatus and method, it is required that the operator has to check the condition of the sealing on a regular basis. That is, in response to the operating condition of the filling apparatus, a sealing check is regularly performed by the operator, the output of the transmitter being adjusted by adjusting the potentiometer, if necessary. Therefore, a skillful labor is required due to the troublesome operation and because it is difficult to grasp a proper condition until sealing is actually performed. In addition, it is difficult to cope with a sudden change and a remote operation is not possible.

The purpose of the present invention is to provide a desirable packaging filling apparatus, which can obtain the most suitable sealing quality by an automatic control without checking the condition of the sealing by the operator on a regular basis. The purpose of the present invention is to provide a packaging filling apparatus and transversal sealing apparatus, which require no troublesome operation in response to operational conditions of the filling apparatus, and no skillful labor by easily and automatically grasping a suitable condition until a most suitable sealing is performed. The purpose of the present invention is to provide a packaging filling apparatus and transversal sealing apparatus, which can cope with a sudden change and a remote operation is possible.

The packaging filling apparatus of the present invention is characterized in that a web-form packaging material having a laminated structure and a conductive layer, which is adjacent to a sealing property thermoplastic layer, is longitudinally sealed to be formed into a tubular shape, a fluid product is filled in said tube, a transversal sealing band is formed by performing a transversal sealing by a transversal sealing apparatus in the transverse direction of said tube, which is cut off into a separate first forming body in said transversal sealing band of the first forming body, which is continuously connected and formed, and formed into a packaging and filling container of the final configuration, and that said transversal sealing apparatus includes a high-frequency oscillator, controller of the same, and an inductor, which generates a magnetic field in said packaging material by receiving the output from the same, and is provided with a sealing quality control means, which transmits a control signal to said controller, based on a statistical relation between a plurality of effect factors affecting the quality of said transversal sealing and the quality of said transversal sealing.

In the packaging filling apparatus of the preferred embodiment of the present invention, the effect factor at least includes a moisture percentage contained in the web-like packaging material, with or without a laminated metal evaporated film, temperature of the fluid product filled therein, characteristics of the sealing thermoplastic layer of the web-like packaging material, and thickness of the conductive layer.

In the preferred embodiment of the packaging filling apparatus according to the present invention, the effect factor at least includes an amount of energy output from the high-frequency oscillator and output impedance from the same.

The preferred embodiment of the packaging filling apparatus according to the present invention receives a factor signal from a detector and/or input means against said effect factor and a sealing quality control means transmits a control signal to said controller.

The transversal sealing apparatus of the present invention, is characterized in that a web-form packaging material having a laminated structure and a conductive layer, which is adjacent to a sealing property thermoplastic layer, is longitudinally sealed to be formed into a tubular shape, a fluid product is filled in said tube, a transversal sealing band is formed by performing a transversal sealing in the transverse direction of said tube, which is cut off into a separate first forming body in said transversal sealing band of the first forming body, which is continuously connected and formed, and formed into a packaging and filling container of the final configuration, and that said transversal sealing apparatus includes a high-frequency oscillator, controller of the same, and an inductor, which generates a magnetic field in said packaging material by receiving the output from the same, and is provided with a sealing quality control means to transmit a control signal to said controller, based on a statistical relation between a plurality of effect factors affecting the quality of said transversal sealing and the quality of said transversal sealing.

In the preferred embodiment of the transversal sealing apparatus of the present invention, the effect factor at least includes a moisture percentage contained in the web-like packaging material, temperature of the fluid product filled therein, characteristics of the sealing thermoplastic layer of the web-like packaging material, with or without a laminated metal evaporated film, thickness of the conductive layer, an amount of energy output from the high-frequency oscillator and output impedance from the same, receives a factor signal against said effect factor from a detector and/or input means and a sealing quality control means transmits control signal to said controller.

In the packaging filling apparatus according to the present invention, the operator does not need to check the sealing condition on a regular basis, and a suitable sealing quality can be obtained by an automatic control. The packaging filling apparatus according to the present invention reduces the sealing check operation by the operator, requires no troublesome operation according to the operational condition of the filling apparatus, and no skillful labor by easily and automatically grasping the suitable conditions until the most suitable sealing is performed. The packaging filling apparatus according to the present invention can cope with an abrupt change, so that the sealing quality is secured.

BRIEF DESCRIPTION OF THE DRAWINGS

While referring to the drawings, the details of embodiments of the present invention will be described as follows.

BEST MODES FOR CARRYING OUT THE INVENTION

Figure 2:
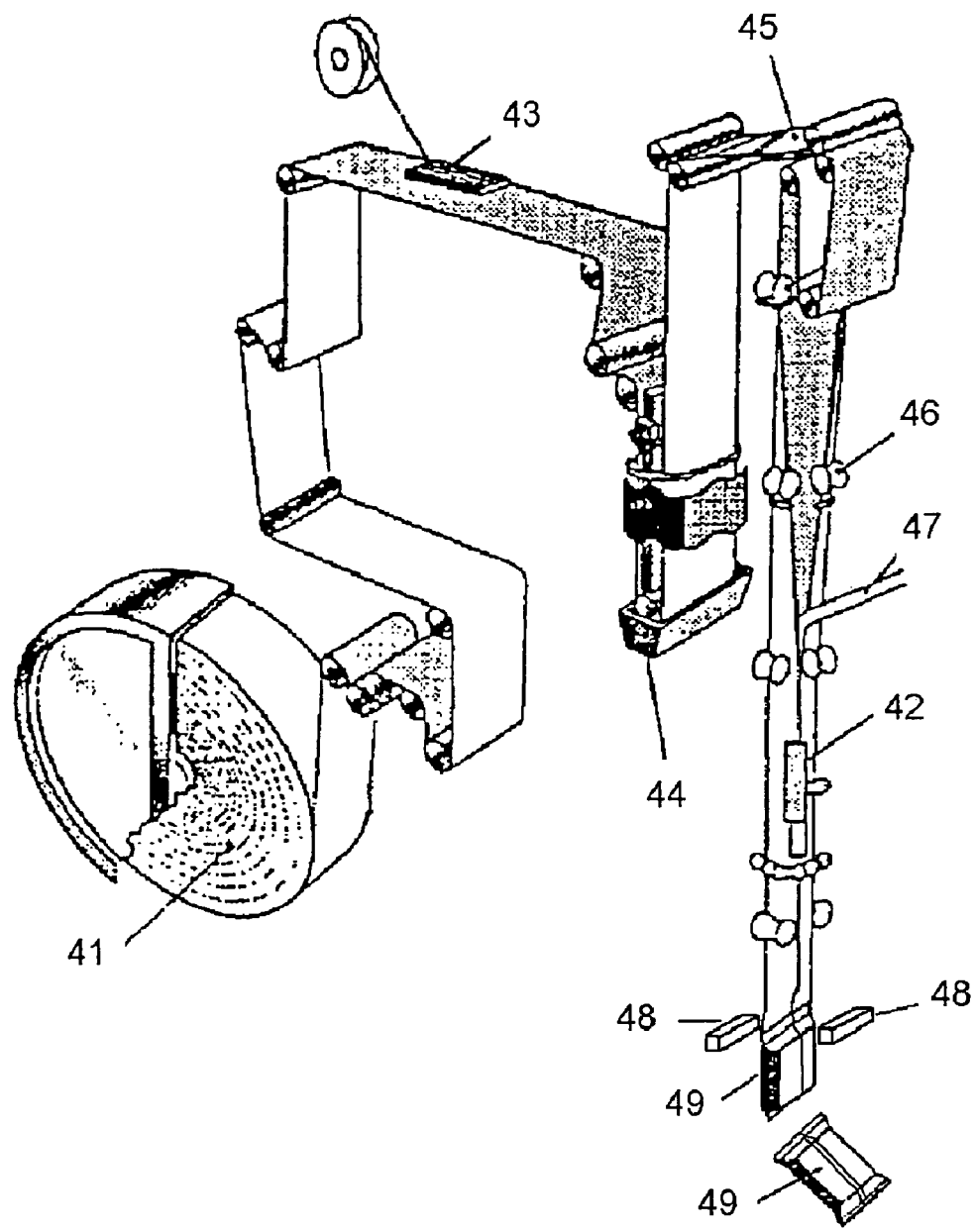
FIG. 2 is an outline perspective view of the packaging filling apparatus applicable to the present invention.

The transversal sealing apparatus according to the present invention is installed in the downstream side of the packaging filling apparatus shown in FIG. 2. A laminated web-like packaging material 41 having a sealing thermoplastic layer and adjacent conductive layer is prepared. As for the sealing thermoplastic layer, there are olefin series resin such as polystyrene and its copolymer. Regarding the conductive layer, for example, there are aluminum foil, steel thin film, metal evaporated film, and the like. The transversal sealing apparatus according to the present invention performs transversal sealing by an induction heating. In the heating system, an eddy current is created in the conductive layer such as aluminum foil, steel thin film, metal evaporated film to generate heat. The heat heats the adjacent sealing property thermoplastic layer to soften and melt the same. To press down the melted packaging material including the sealing property thermoplastic layer contributes the sealing.

In the packaging filling apparatus shown by the example, a roll-type laminated packaging material web 41 is rolled out to be conveyed in the packaging filling apparatus by the roller. A strip tape is spliced to an edge of the packaging material web by a strip tape applicator 43. The packaging material web passes through a sterilization tank 44 to be sterilized. The sterilizing treatment liquid attached on the surface of the packaging material is removed by a squeezing roller and air knife 45.

The packing material is formed into a tubular shape by a forming roller 46. An overlap is formed by superimposing both ends of the packaging material, and sealing is performed by a longitudinal sealing element 42 along the longitudinal direction of the tube at the overlap in the longitudinal direction. Into the tube, liquid foods are filled from a filling pipe 47. While moving the tube downward by the length corresponding to one packaging container, the tube is sandwiched by a sealing jaw of the transversal sealing apparatus 48 and an opposing jaw. A transversal sealing is performed by the induction heating and the transversal sealing band is formed. At the same time, it is continuously formed into a first forming body 49. The transversal sealing band of the first forming body is cut in the middle by a blade for cutting packaging material (not shown) of a cutting apparatus (not shown) into a separate first forming body 49 to form the packaging filling container of a final configuration.

Figure 4:
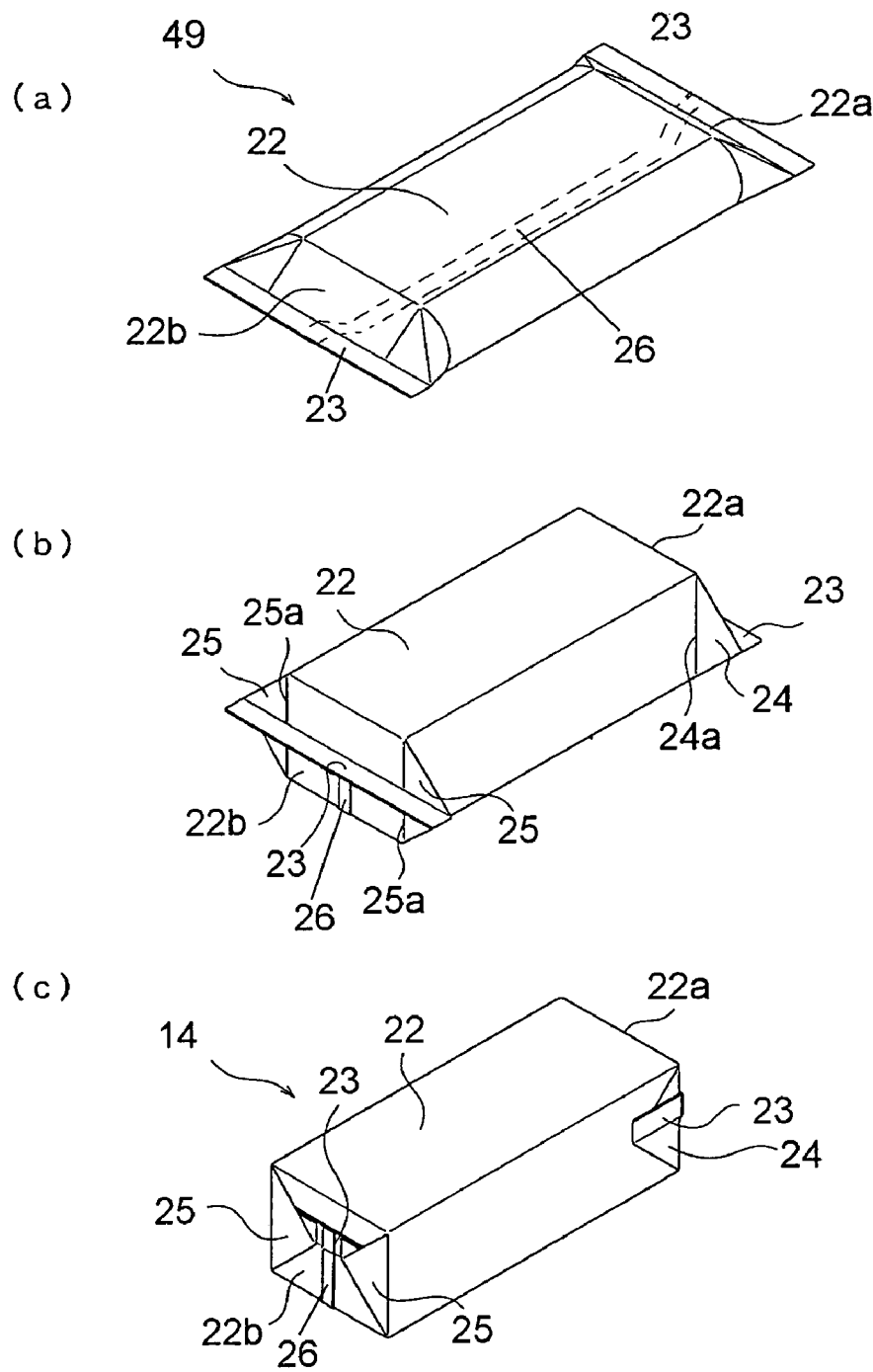
FIG. 4 is a perspective view illustrating the outline of forming of the final configuration of the packaging container obtained by the packaging filling apparatus according to the present invention.

In FIG. 4, an embodiment is shown in which the first forming body 49 is folded into the final configuration. The first forming body 49 is sealed by two lateral (lateral line) sealing bands 23 and a longitudinal sealing band 26, and provided with side walls 22, 22b and 22a, which are divided by a folding line. (Refer to FIG. 4 (a)) As shown in FIG. 4 (b), along the folding line, the main body of the first forming body is formed into a rectangular solid form, and on the edge, transversal sealing bands 23 and flaps 24, 25 are formed to rise straight from the wall of the container. Transversal sealing bands 23 rise straight from a base surface 22b and top surface 22a, and flaps 24, 25 are communicated with the wall of the container integrally 11 through edge sides 25a, 24a.

Next, as shown in FIG. 4(c), after the transversal sealing band 23 is folded, the flaps are rotated around the edge line, the flap 24 of the top side of the container is folded into the side wall 22, and the flap 25 of the bottom side of the container being folded into the base surface 22b.

A paper container 14 filled with a fluid food in a rectangular solid form according to the folding embodiment shown in FIG. 4 (c) has a folded transversal sealing band 23, walls 22 and 22a of the container, and the longitudinal sealing band 26, which runs from the top surface 22a through the back wall of the container to the bottom surface, and provided with a flap 24, which is folded through the edge side 24a.

Figure 3:
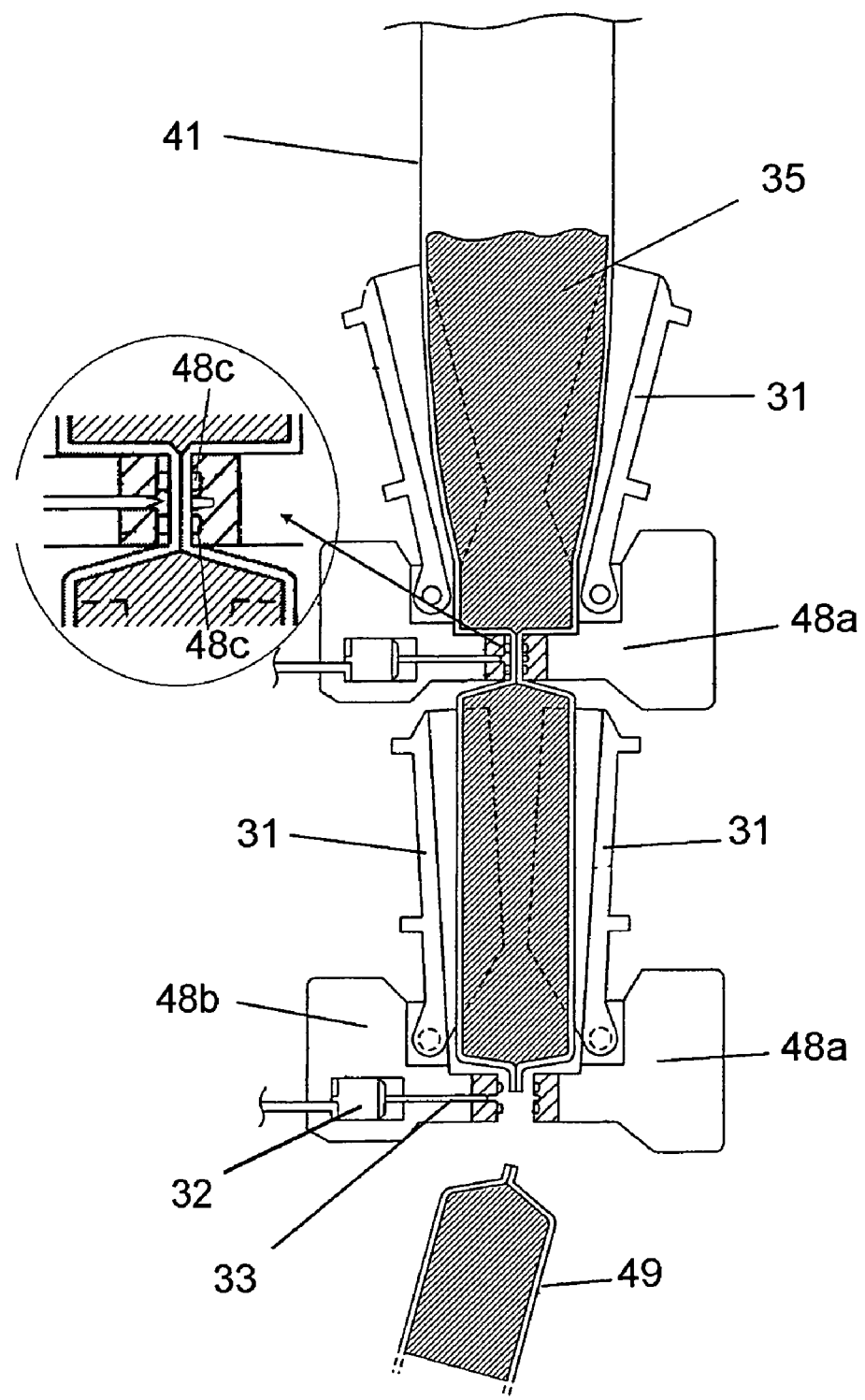
FIG. 3 is a partial cross section of the transversal sealing apparatus of the packaging filling apparatus and the transversal sealing apparatus according to the embodiment of the present invention.

In FIG. 3, where detailed partially sectional view of the transversal sealing apparatus 48 is shown, while being moved downward by the length corresponding to one packaging container, a tubular packaging material 41, which is filled with fluid product 35, is caught in two pairs of forming flaps 31 to be formed into a rough shape of a container, being sandwiched by two pairs of sealing jaws 48a and opposing jaws 48b, forming a transversal sealing band by performing transversal sealing in the transverse direction. In the sealing jaw 48a, two inductors 48c are installed on the operational surface. The two inductors receive an output from the high-frequency oscillator to generate a magnetic field towards the packaging material. According to the change of the magnetic field, an eddy current is created in the conductive layer such as aluminum foil, steel thin film, metal evaporated film to generate heat. The heat heats the adjacent sealing property thermoplastic layer to soften and melt the same. By pressing and cooling down, two transversal sealing bands are formed. Next, the sealing band of the connected first forming body is cut off in the middle by the knife 33 of the cutting apparatus 32, having a cutting mechanism driven by a pressuring medium (oil pressure, air pressure) into a separate first forming body 49.

Figure 1:
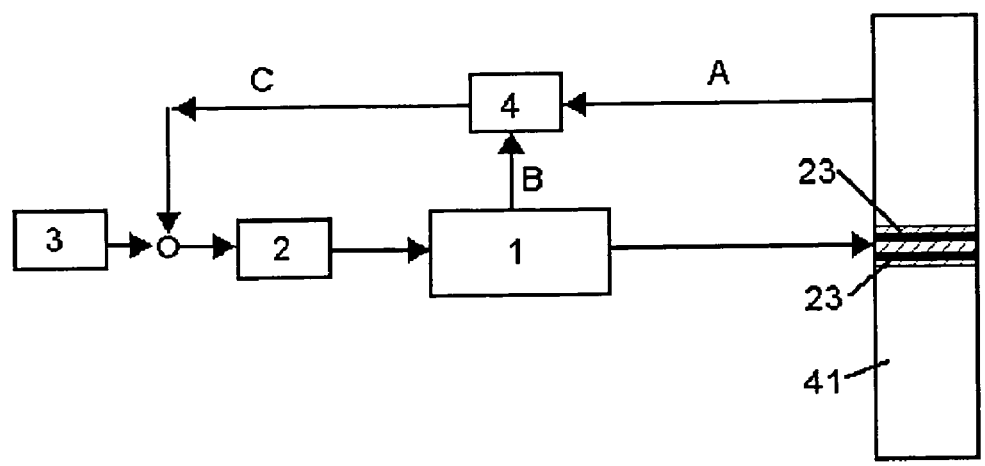
FIG. 1 is a block diagram illustrating the operation of the transversal sealing apparatus according to the embodiment of the present invention.

A rough block diagram of the transversal sealing apparatus according to an embodiment of the present invention is shown in FIG. 1. The transversal sealing apparatus 48 according to the embodiment includes a high-frequency oscillator 1, a controller 2 of the same, and an inductor 48c, which generates a magnetic field in the packaging material 41 by receiving the output from the same. In the packaging material 41, two transversal sealing bands 23 are formed. The transversal sealing apparatus 48 according to the embodiment is provided with a sealing quality control means 4, which transmits a control signal to the controller 2, based on a statistical relation between a plurality of effect factors affecting the quality of the transversal sealing and the quality of the transversal sealing, and an input apparatus 3, to which the operator inputs setting values of the transversal sealing (the width of the lateral seal, the thickness of the seal, the seal strength and the like).

The effect factors according to the preferred embodiment at least includes a moisture percentage contained in the web-like packaging material, with or without a laminated metal evaporated film, temperature of the fluid product filled therein, characteristics of the sealing thermoplastic layer of the web-like packaging material, thickness of the conductive layer, an amount of energy output from the high-frequency oscillator and output impedance from the same. The statistical relation among a plurality of effect factors affecting the quality of the transversal sealing, the quality of the transversal sealing, and this embodiment is, for example, a processing by such as a regression analysis. An estimation equation can be made by making the above effect factor an explanatory variable and by taking the width of the sealing (as the quality of the transversal sealing) as an objective variable.

While referring to the rough block diagram of FIG. 1, operations will be illustrated. The transversal sealing apparatus 48 according to the embodiment receives effect factors A from a detector (not shown) during or prior to the operation of the packaging filling apparatus, such as a moisture percentage contained in the web-like packaging material, with or without a laminated metal evaporated film, temperature of the fluid product filled therein, characteristics of the sealing thermoplastic layer of the web-like packaging material, thickness of the conductive layer. On the other hand, the apparatus receives effect factors B such as an amount of energy output from the high-frequency oscillator and output impedance from the same. It is allowable that the operator manually inputs by the input means instead of the detector. On receiving these factor signals, the sealing quality control means 4 transmits a control signal C to the controller 2.

It is not included in the above-mentioned embodiment, however, it is possible to monitor, if necessary, such as upper and lower limits of sealing jaw oil pressure, the sharpness of the cutter knife, the flow rate of cooling water as monitoring items. In addition, the present invention is not limited to the above-mentioned embodiments and it is possible to variously deform based on the purpose of the present invention, which is not excluded from the scope of the present invention.

INDUSTRIAL APPLICABILITY

It is possible to produce the packaging container filled with liquid foods such as milk and juice.

What is claimed is:

1. A packaging filling apparatus in which a web-form packaging material having a laminated structure and a conductive layer adjacent to a sealing property thermoplastic layer, is longitudinally sealed to be formed into a tubular shape and a fluid product is filled in the tube, the package filling apparatus comprising:

a transversal sealing apparatus which performs, at longitudinally spaced apart locations on the tube, transversal sealing in a transversal direction of the tube to form transversal sealing bands on the tube;

a cutting apparatus which cuts the tube in the transversal sealing bands to produce a first forming body which is subsequently formed into a packaging filling container of a final configuration;

the transversal sealing apparatus comprising a high-frequency oscillator, a controller connected to the high-frequency oscillator, an inductor connected to the high-frequency oscillator and receiving output from the high-frequency oscillator to generate a magnetic field in the packaging material, and a sealing quality control means transmitting a control signal to the controller based on a statistical relation between a plurality of different effect factors affecting quality of the transversal sealing and the quality of the transversal sealing, the controller controlling the high-frequency oscillator based on the control signal from the sealing quality control means; and the effect factors affecting the quality of the transversal sealing comprise effect factors A which include a moisture percentage contained in the web-like packaging material, with or without a laminated metal evaporated film, temperature of the fluid product filled therein, characteristics of the sealing thermoplastic layer of the web-like packaging material and thickness of the conductive layer, as well as effect factors B which include an amount of energy output from the high-frequency oscillator and output impedance from the high-frequency oscillator.

2. The packaging filling apparatus according to claim 1, further comprising a detector and/or input means connected to the transversal sealing apparatus for providing the plurality of different effect factors.

3. A transversal sealing apparatus for a packaging filling apparatus in which a web-form packaging material having a laminated structure and a conductive layer adjacent to a sealing property thermoplastic layer is longitudinally sealed to be formed into a tubular shape, and a fluid product is filled in the tube, the transversal sealing apparatus comprising:

a high-frequency oscillator;

an inductor connected to the high-frequency oscillator and receiving output from the high-frequency oscillator to generate a magnetic field in the packaging material to perform transversal sealing of the tube producing a transverse sealing band in the tube;

a controller connected to the high-frequency oscillator; and sealing quality control means connected to the controller to transmit a control signal to the controller based on a statistical relation between a plurality of different effect factors affecting quality of the transversal sealing and the quality of the transversal sealing, the controller controlling the high-frequency oscillator based on the control signal from the sealing quality control means; and the effect factors affecting the quality of the transversal sealing comprise effect factors A which include a moisture percentage contained in the web-like packaging material, with or without a laminated metal evaporated film. temperature of the fluid product filled therein, characteristics of the sealing thermoplastic layer of the web-like packaging material and thickness of the conductive layer. as well as effect factors B which include an amount of energy output from the high-frequency oscillator and output impedance from the high-frequency oscillator.

4. The transversal sealing apparatus according to claim 3, further comprising a detector and/or input means connected to the transversal sealing apparatus for providing the plurality of different effect factors.

* * * * *